United States Patent [19]
Kish et al.

[11] Patent Number: 5,315,790
[45] Date of Patent: May 31, 1994

[54] GEAR TOOTH TOPOLOGICAL MODIFICATION

[75] Inventors: Jules G. Kish, Milford; Charles Isabelle, Winsted, both of Conn.

[73] Assignee: United Technologies Corporation, Hartford, Conn.

[21] Appl. No.: 998,483

[22] Filed: Dec. 30, 1992

[51] Int. Cl.$^5$ .................. B24B 1/00; B23F 19/05; F16H 1/06
[52] U.S. Cl. .................. 51/165.71; 51/287; 74/462; 29/893.35
[58] Field of Search ........... 51/165.71, 165 R, 165.75, 51/287, 105 GG, 52 R, 324, 162.92; 29/893.3, 893.35; 409/51; 74/462

[56] References Cited

U.S. PATENT DOCUMENTS 5,083,474  1/1992  Rouverol ........................ 74/462
5,092,720  3/1992  Abysov et al. .................. 409/51

FOREIGN PATENT DOCUMENTS 2445104  9/1975  Fed. Rep. of Germany ........ 74/462

OTHER PUBLICATIONS

"Modification of Gear Tooth Profiles"; D. W. Dudley Product Engineering Sep. 1949; pp. 126–131.

*Primary Examiner*—Robert A. Rose
*Attorney, Agent, or Firm*—Terrance J. Radke

[57] ABSTRACT

The topology of parallel axis gears, such as spur and helical gears is modified to produce quieter and more smoothly operating gear sets with more uniform load distribution. A finite element analysis of the gear in its operating mode is made to produce a plot of radial and tangential deflections of the pinion and gear tooth surfaces which will occur when the gears are loaded during operation. The resultant plot is then inverted to produce a plot, or set of coordinates, which will define the path of travel of the gear tooth grinding wheel, which path is a mirror image of the plot of the finite element analysis. The resulting gears, when subjected to operating loads, will thus be deflected tangentially and radially to their optimum operating, or theoretical true involute, positions so as to produce quieter, smoother, and more evenly loaded gear trains.

11 Claims, 4 Drawing Sheets

INVOLUTE PROFILE CHART

INVOLUTE PROFILE TABLE

| ROLL ANGLE | INVOLUTE MODIFICATION | |
|---|---|---|
| | MAX | MIN |
| 20° 44.3' | −0.00020 | 0 |
| 20° 48.8' | −0.00021 | 0 |
| 20° 53.3' | −0.00023 | 0 |
| 21° 2.1' | −0.00031 | −0.00003 |
| 21° 10.9' | −0.00045 | −0.00013 |
| 21° 19.9' | −0.00065 | −0.00028 |
| 21° 28.6' | −0.00090 | −0.00050 |

| FACE WIDTH | LEAD | |
|---|---|---|
| | MAX | MIN |
| 0.000 | −0.00135 | −0.00191 |
| 0.125 | −0.00108 | −0.00156 |
| 0.250 | −0.00086 | −0.00126 |
| 0.375 | −0.00067 | −0.00101 |
| 0.500 | −0.00053 | −0.00082 |
| 0.625 | −0.00040 | −0.00066 |
| 0.750 | −0.00026 | −0.00051 |
| 0.875 | −0.00013 | −0.00035 |
| 1.000 | 0.00000 | −0.00020 |
| 1.125 | +0.00015 | −0.00007 |
| 1.250 | +0.00031 | +0.00006 |
| 1.375 | +0.00046 | +0.00020 |
| 1.500 | +0.00062 | +0.00033 |
| 1.625 | +0.00076 | +0.00042 |
| 1.750 | +0.00086 | +0.00046 |
| 1.875 | +0.00092 | +0.00044 |
| 2.000 | +0.00094 | +0.00038 |

"X" MARKED END OF GEAR

GEAR TOOTH TOPOLOGICAL MODIFICATION

The invention described herein was made in the performance of work under NASA Contract No. NAS3-25423 and is subject to the provisions of Section 305 of the National Aeronautics and Space Act of 1958 (72 Stat. 435; 42 U.S.C. 245

DESCRIPTION

1. Technical Field

This invention relates to improved gear teeth and a method of forming the same. More particularly, this invention relates to parallel axis gear trains which have modified tooth surfaces so as to negate the effects of tooth deflections which occur under operational loading of the gears.

2. Background Art

Parallel axis gear trains such as helical gears, spur gears, and the like, i.e., gear sets or trains whose individual gears rotate about parallel axes, will experience gear tooth deflections when under operational loading. The extent of such deflections will vary with the type and size of the gears, however, tooth load distribution, noise and vibration are all related to the amount of load-induced deflection on the gear teeth. It has been recognized that gears that are formed to produce ideal meshing when not subjected to load will experience meshing errors due to load-induced tooth deflections. These deflections may result from a change of the gear position relative to its support casing; from bending, torsion and shear of the shafts on which the gears are mounted; and from localized deflections of the teeth themselves resulting from various sources.

In the past, attempts have been made to correct load-induced gear tooth displacements. One approach has been to form ascending and descending cuts in the tooth roots at opposite ends of the gear. These cuts are localized at the ends of the gears so that the end portions of the root are convergent with the gear axis. This approach is known in the art as "crowning". The remainder of the gear root is maintained parallel to the axis of rotation of the gear. This solution affords partial correction to tangential deflections of the gear teeth which occur under loads and helps to avoid end loading. Other attempts to achieve uniform load distribution across face, and from tip to true involute form (TIF) diameter include helix corrections or lead modification corrections; and tip relief for parallel axis gears. All of these solutions are directed toward countering the tangential tooth deflections directly, and take into account, or deal with, the problems created by radial deflections of the gear tooth surfaces only indirectly by applying additional tangential corrections.

DISCLOSURE OF THE INVENTION

This invention relates to an improved gear for use in parallel axis gear trains, and to a method of forming the same. The gear teeth on the gear of this invention are topologically modified so as to compensate for load-induced tooth deflections, both radial and tangential. The gear teeth thus assume the theoretical true involute shape when operational load is applied to the gear train.

As previously noted, load-induced gear tooth deflections will result in deviations from the theoretical true involute shape of the gear teeth, which deviations can be calculated and plotted using the finite element analysis technique. The resultant radial and tangential deflection may be plotted to produce a topological "map" of the tooth surfaces under load. By "topological map" we mean a map or plot which identifies the load-induced deviations from the theoretical true involute gear tooth shape.

When the load-induced tangential and radial deflection plots have been produced, an equal and opposite, or mirror, tooth grinding wheel path is created which can be inputted into a numerically controlled gear form grinding machine whereby the X, Y and Z axis position of the grinding wheel can be accurately controlled from one end to the other of each tooth grinding pass of the wheel. Kaap and Co. of Coburg, Germany, produces a line of gear form grinding machines which are computer numerically controlled (CNC) and can be programmed to perform the gear grinding method, and produce the topologically-modified gears of this invention. Other types of CNC form grinding machines can also be used.

The grinding wheel which is used to form grind the topologically modified gear teeth is a full contact wheel that is formed with the appropriate gear tooth profile, and that moves from one end of the gear to the other while grinding the sides of adjacent teeth and the intervening tooth root. The modified topology is produced by controlling the path of movement of the grinding wheel from one end of the gear to the other, and reverse. The grinding wheels are preferably provided with a high hardness grinding surface, such as cubic boron nitride (CBN) particles. These wheels can cut a plurality of gears without requiring repeated dressing. When the grinding wheel demonstrates unacceptable wear, it is simply removed and replaced with a new wheel. Worn grinding wheels are then stripped and re-clad with the CBN particles. The configuration of the cutter is determined from an involute profile chart of the desired gear tooth, and the path of movement of the grinding wheel is determined from an inversion of the finite element analysis deflection vs. face width of the gear tooth under operational load.

Since it is more difficult to produce a gear with modified profiles, preferably only one member of the mesh is modified. This member is usually the pinion since it is smaller and easier to manufacture. The deflections of both the pinion and gear are added to determine the total mesh deflection. All corrections are then made to the pinion only.

It will be noted that the gear tooth modifications described above are calculated for a "worst case" operating mode, i.e., an operating mode which occurs at a known power level, usually a high power-high time mode, such as maximum cruise, or take off, in a helicopter. Thus the modifications will alleviate a normally high vibration, extended time operating condition. Tooth crowning can be used to alleviate vibration and other conditions at lower power levels even though ideal load distribution will not be achieved at such lower levels.

It is therefore an object of this invention to provide an improved parallel axis gear train wherein the gear teeth therein will assume a theoretical true involute shape when under operational load.

It is an additional object of this invention to provide a gear train of the character described wherein the gear teeth are provided with a topology which deviates from the theoretical true involute.

It is another object of this invention to provide a gear train of the character described wherein the gear tooth topology deviates from the theoretical true involute in both the tangential and the radial directions.

It is a further object of this invention to provide a method for making gears for a gear train of the character described.

These and other objects and advantages of the invention will become more readily apparent from the following detailed description of a preferred embodiment thereof, when taken in conjunction with the accompanying drawings, in which:

BEST MODE FOR CARRYING OUT THE INVENTION

Figure 1:
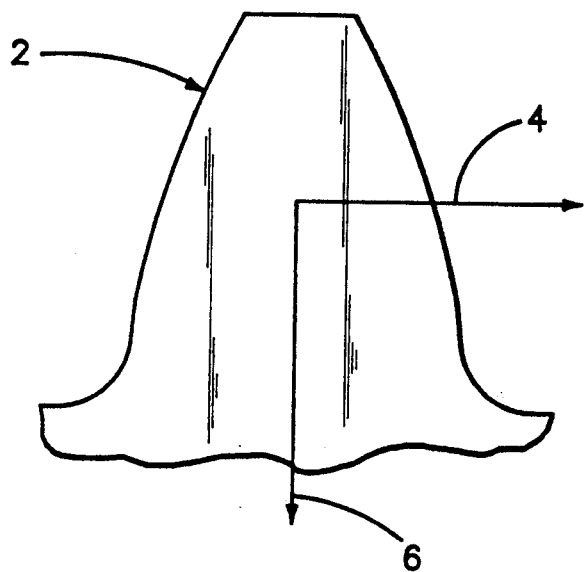
FIG. 1 is a schematic end elevational view of a typical gear tooth.

Referring now to FIG. 1, there is shown schematically a typical gear tooth profile 2. The tooth 2 will, when operationally loaded, be tangentially deflected, as indicated by the arrow 4, and will also be concurrently radially deflected, as indicated by the arrow 6.

Figure 2:
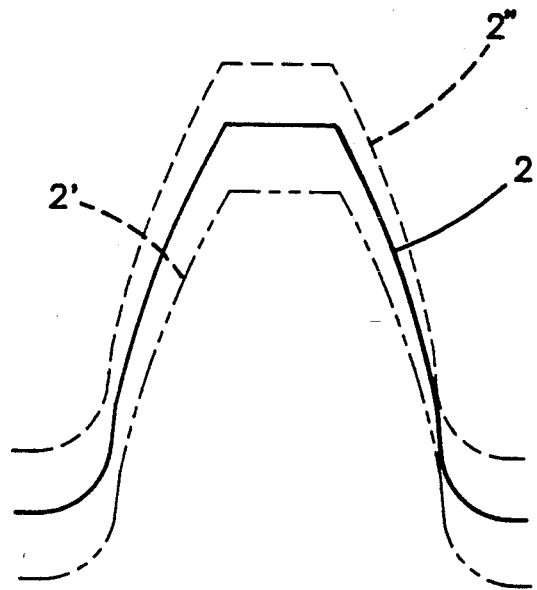
FIG. 2 is a view similar to FIG. 1, which shows in exaggerated fashion how a particular point on the face width of the tooth is deflected under load, and also shows the mirror image of the deflected state which is used to chart the grinding wheel path.

FIG. 2 shows the result, schematically and in exaggerated fashion, of the concurrent tangential and radial deflection of the tooth at one position along the face width. Under load, the tooth (teeth) will deflect from the theoretical true involute position 2 to a loaded deflected position 2' (shown in phantom lines) which is radially and tangentially offset from the true involute position 2. In order to negate the problems which arise from the load deflection of the tooth surfaces, the tooth surfaces are originally formed as shown at 2" (shown in dashed lines), which is an equal and opposite mirror image inversion of the loaded position 2'. The entire tooth width will be plotted in this fashion.

Figure 3:
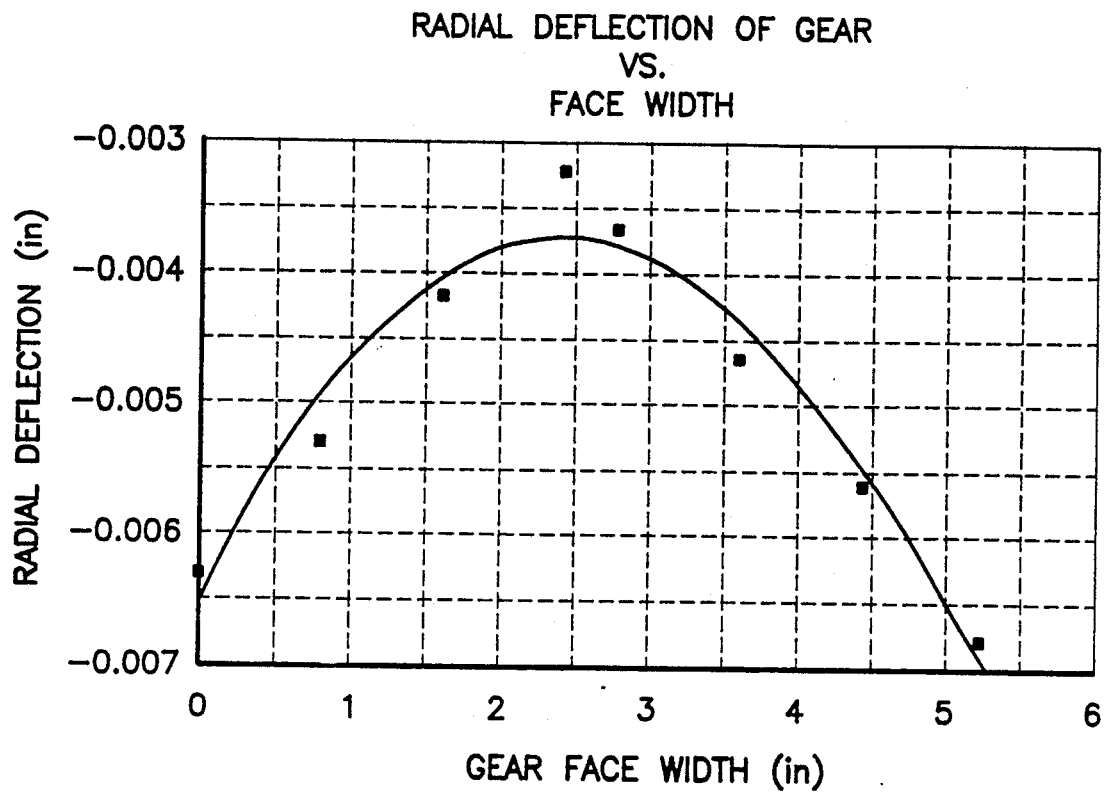
FIG. 3 is a plot of the radial deflections of the tooth of a gear across the face width which results from the finite element analysis of the gear tooth under operational load.

The position 2' is derived by means of a finite element analysis of the gear teeth under load. FIG. 3 is a plot of the radial deflection of the gear tooth under load, which plot is obtained from the aforesaid finite element analysis. The tooth deflection is shown on the Y axis, and the location of the tooth deflection across the gear face is shown on the X axis.

Figure 4:
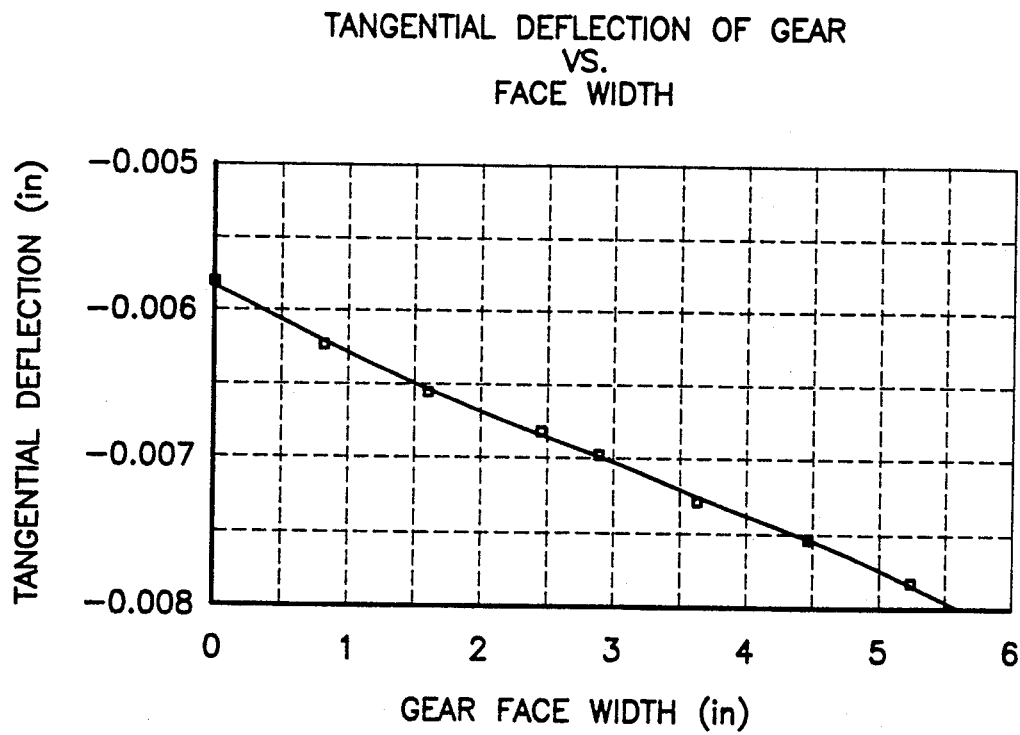
FIG. 4 is a plot of the tangential deflection of the tooth across the face width which is also derived from a finite element analysis.

FIG. 4 is a plot of the tangential deflection of the gear tooth under load, also obtained by the finite element analysis procedure. It will be noted that FIG. 3 demonstrates that radial tooth deflection across the gear face is a constantly varying phenomenon, with the slope of the plots changing depending on the location of the points across the width of the gear face. By contrast, the tangential deflections as shown in FIG. 4 has a relatively constant slope. Similar plots are developed for the radial and tangential deflection of the pinion. The total radial deflection correction is the sum of the radial correction on the pinion and on the gear, while the total tangential correction is the sum of the tangential correction on the pinion and gear. The machine grinding wheel path will be determined by reference to these pinion and gear deflection plots, as will be explained hereinafter.

Figures 5, 6:
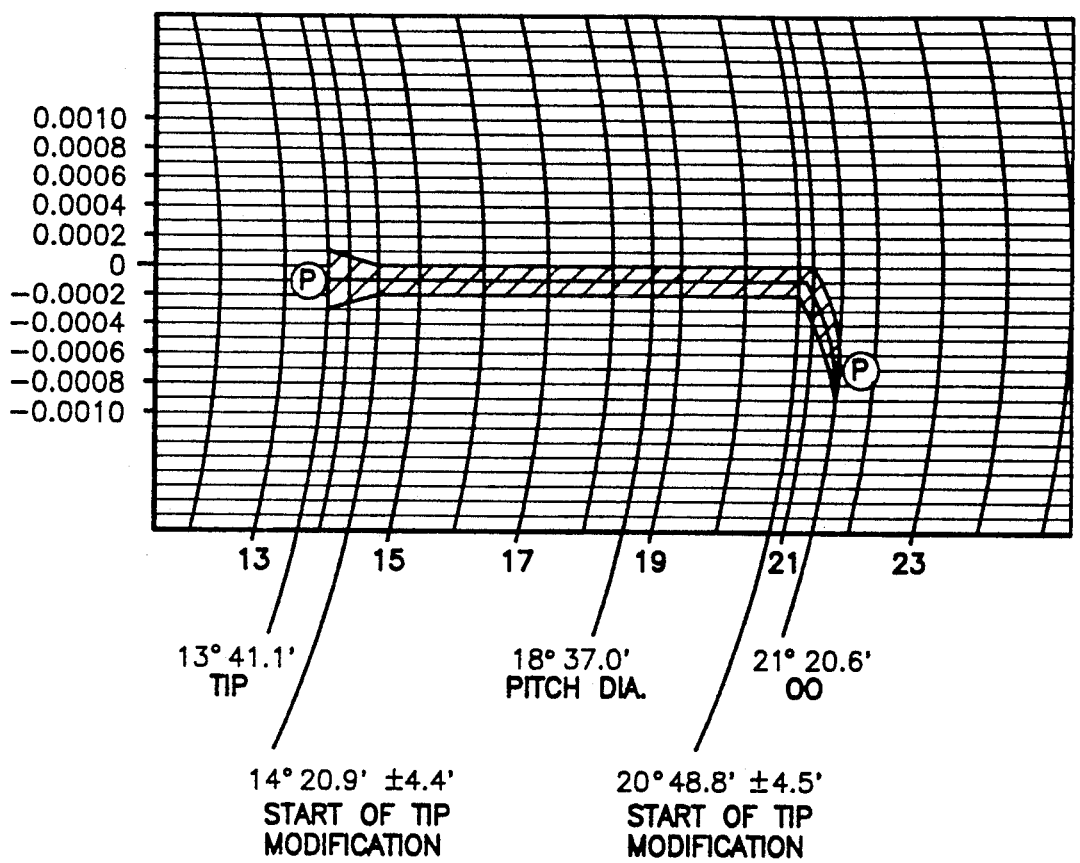
FIG. 5 is an involute profile chart of the gear tooth configuration derived from a tip relief analysis, which defines the modified topology of the gear tooth profile, and which is used to define the gear grinding wheel profile.
FIG. 6 is a numerical table which defines the gear tooth tip relief portion of the profile and also defines the requirements for the gear tooth grinding wheel.

Referring now to FIGS. 5 and 6, there is shown in FIG. 5 an involute profile chart of the gear tooth to be manufactured by the grinder. The profile chart describes the desired shape of the gear teeth to be ground by the grinding wheel and is used to form the correct crosssectional configuration of the gear tooth grinding wheel. The gear teeth will be formed with a tip modification which is shown at the right hand end of the profile chart. FIG. 6 is a profile table of the tip modification portion of the profile chart, which table shows the roll angle ranges vs. the involute modifications for the finished gear.

Figure 7:
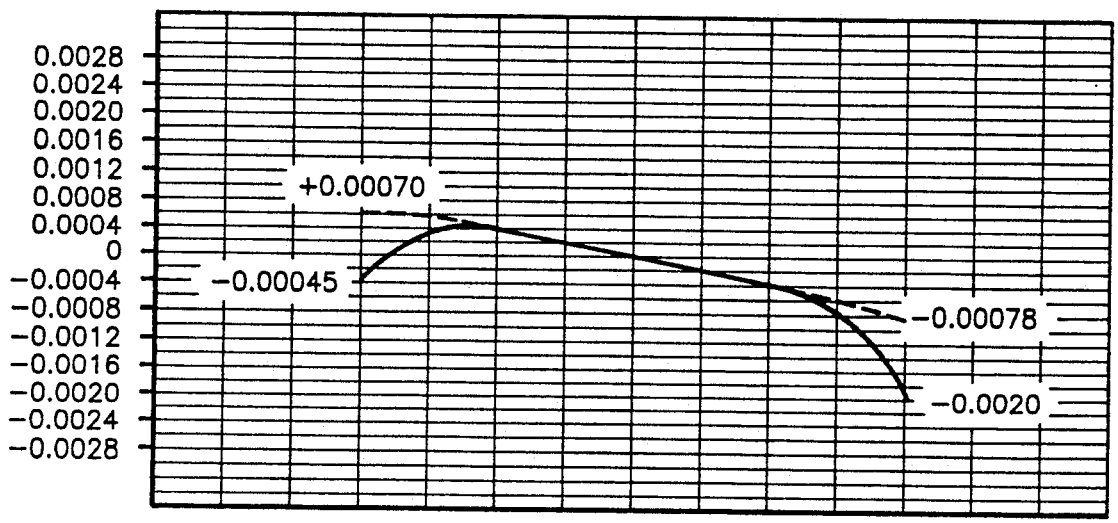
FIG. 7 is a plot of the radial deflection of the path of travel of the gear tooth grinding wheel used to form the modified gear tooth topology.
Figure 8:
FIG. 8 is a pitch line lead chart with tolerances used to check the gear after manufacture wherein deviations shown are from the combined radial and tangential corrections.

FIG. 7 is a chart of the radial grinding wheel path that the gear grinding wheel takes as it travels across the pinion face width, which cutting path has been modified from the theoretical straight line parallel to the pinion axis, and which is derived from the finite element analysis plot similar to that shown in FIG. 3 combined with the pinion radial deflections. The cutter path defined by FIG. 7 is a mirror inversion of the sum of the radial deflections from a chart similar to FIG. 3 combined with the pinion radial deflections. It defines the location of the tooth root, relative to the axis of rotation of the pinion, along the face width of the pinion. FIG. 8 is a lead chart used for checking the finished pinion which shows the deviation of the pitch line caused by the combined radial and tangential corrections. The gear face width increments in FIG. 8 are linear; while the lead angle varies non-linearly across the tooth face. Since the tangential deflection is substantially linear, the cutter path tangential lead angle modification is constant, and does not vary across the face of the gear. The amount of tangential modification is therefore defined in FIG. 8 as a constant value. If necessary, however, the tangential lead angle for the cutter path could also be non-linear. Thus, the tangential correction is a grinding wheel lead angle which varies from the theoretical helix angle by a constant increment, or from zero helix in the case of a spur gear.

It will be noted that the gear tooth root of parallel axis gears formed in accordance with this invention will not be parallel to the axis of rotation of the gear, but will instead have a topology which will result in the achievement of the true involute shape when the gears are operationally loaded.

Since many changes and variations of the disclosed embodiment of the invention may be made without departing from the inventive concept, it is not intended to limit the invention otherwise than as required by the appended claims.

What is claimed is:

1. A parallel axis gear having a modified tooth topology which is derived from a finite element analysis of a gear train which includes said gear, which analysis is made at a predetermined gear train operating load to calculate tangential and radial load-induced gear tooth deflections, said gear having a ground tooth topology which mirrors said calculated tangential and radial tooth deflections so that said gear teeth will assume a substantially true involute configuration when subjected to said predetermined operating load.

2. The gear of Claim 1 wherein the gear tooth roots thereon are not parallel to the axis of rotation of the gear.

3. The gear of Claim 2 wherein the gear tooth root varies non-linearly from true involute across the face of the gear.

4. The gear of Claim 1 wherein the tangential lead angle of the gear teeth varies linearly from true involute across the face of the gear.

5. The gear of Claim 1 wherein said gear is a pinion gear in the gear train, and wherein finite element analyses are performed on both gears in said gear train, and wherein said ground tooth topology on said gear equals the sum of the calculated tangential and radial deflections of both gears in said gear train.

6. A method for forming a topologically modified parallel axis gear, said method comprising the steps of:
   a) performing a finite element analysis of a gear train which includes said gear, said analysis being performed at a predetermined gear train operating load to calculate tangential and radial load-induced gear tooth deflections which produce gear tooth deviations from theoretical true involute under said predetermined operating load;
   b) producing a topological map of the gear tooth surfaces under load from the results of said finite element analysis;
   c) determining a gear tooth grinding wheel path of motion which will produce a gear tooth topology on said gear that is equal and opposite to said topological map; and
   d) grinding said gear by moving a grinding wheel along said path of motion whereby the resultant gear will possess a tooth topology which is equal and opposite to said topological map so that the gear teeth will assume the theoretical true involute configuration when the gear is subjected to said predetermined operating load.

7. The method of Claim 6 wherein said grinding step is performed with a computer numerically controlled gear form grinding machine having said grinding wheel path of motion preprogrammed therein.

8. The method of Claim 7 wherein said grinding machine includes a grinding wheel having a cubic boron nitride particulate grinding surface.

9. The method of Claim 8 wherein said grinding wheel path of motion includes a radial component which varies non-linearly from true involute across the face of the gear.

10. The method of Claim 9 wherein said grinding wheel path of motion includes a tangential component which varies linearly from true involute across the face of the gear.

11. The method of Claim 6 wherein said gear tooth grinding wheel path is determined from an operational load composite finite element analysis of both gears in the gear train.

* * * * *